(No Model.)
T. FOLEY.
APPARATUS FOR PURIFYING WATER.
No. 387,406. Patented Aug. 7, 1888.
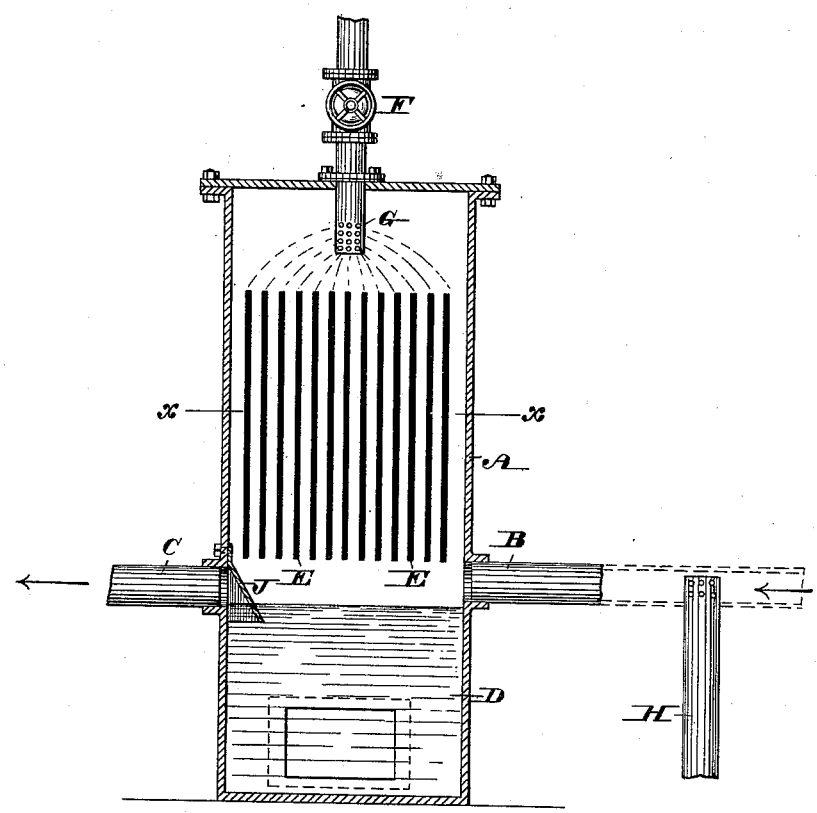
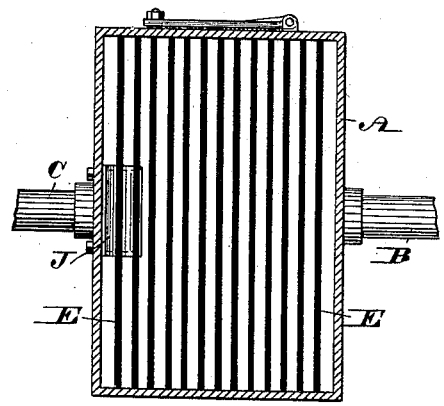
WITNESSES:
Th. Rollé.
A. P. Jennings.
INVENTOR:
Thomas Foley
BY
ATTORNEYS.

United States Patent Office.

THOMAS FOLEY, OF PHILADELPHIA, PENNSYLVANIA, ASSIGNOR, BY MESNE ASSIGNMENTS, TO WARREN WEBSTER, OF SAME PLACE.

APPARATUS FOR PURIFYING WATER.

SPECIFICATION forming part of Letters Patent No. 387,406, dated August 7, 1888.

Application filed December 20, 1887. Serial No. 258,480. (No model.)

*To all whom it may concern:*

Be it known that I, THOMAS FOLEY, a citizen of the United States, residing in the city and county of Philadelphia, State of Pennsylvania, have invented a new and useful Improvement in Apparatus for Purifying Water, which improvement is fully set forth in the following specification and accompanying drawings.

My invention consists of an apparatus constructed substantially as hereinafter described, whereby water may be converted into vapor of low tension, thus causing the deposition of impurities of said water and production of pure water.

Figure 1 represents a partial side elevation and partial vertical section of an apparatus for purifying water embodying my invention. Fig. 2 represents a horizontal section thereof on line $x$ $x$, Fig. 1.

Similar letters of reference indicate corresponding parts in the two figures.

Referring to the drawings, A represents a tank or vessel of suitable material and shape, the same having a water-induction pipe, B, and steam-eduction pipe C. Secured to or formed with the lower part of the tank A, below the pipes B C, is a well, D, which constitutes a downward extension of said tank and communicates therewith. Within the tank, above said pipes B C, are thin plates E of metal of good heat-conducting qualities, preferably copper, the same being secured to the walls of the tank and extending vertically and separated one from another, leaving passages between them. The vertical position of the plates permits the unrestricted passage of the spray, it more easily falling between the same than if they were inclined, and without resting thereon, so that a vapor of low tension is generated.

Connected with the tank is a pipe, F, for the admission of water to be purified therein above the plates E, said pipe having at its inner end a perforated nozzle or rose, G, whereby the water enters the tank in the form of fine spray.

The pipe B is connected with a place of supply of steam, whereby the steam enters the tank, the effect of which is the heating of the plates E. Water is finely sprayed into the tank through the pipe F and subjected to the latent heat of the plates E, whereby it is converted into vapor of low tension, the effect of which is the disintegration of the vaporized water and the liberation of the impurities therein, said impurities dropping into the well and sinking to the bottom thereof. The pure water is also deposited in said well and escapes through the pipe C at the top of the same, it being in warm condition ready to enter a boiler or be directed or pumped elsewhere for use.

Should the steam entering the pipe B be of such power as to convert the sprayed water into steam or vapor of high tension, thus preventing the liberation of the impurities in the water admitted at G, a jet or pipe, H, may be connected with the pipe B for directing cold water thereinto, so as to reduce the tension of the steam previous to entrance into the tank.

In order to direct the impurities as they drop below the plates E from the open end of the pipe C, the inner end of said pipe is guarded by a hood, J, which is closed at top and open at bottom and secured to the tank or pipe, its lower end being below the water-line in the well D, whereby only pure water is permitted to escape from said well.

I am aware that it is not new to provide a feed-water device with means for filtering or purifying the water passing through the same, said means consisting of a steam-inlet pipe adapted to slightly heat the inflowing water, so as to cause the impurities to settle in the lower portion of the tank before the water is discharged, and such I do not claim; but I am not aware that it is old to employ vertical plates, preferably of copper, as herein described, the water being sprayed before contact with said plates.

Having thus described my invention, what I claim as new, and desire to secure by Letters Patent, is—

1. A device for the purpose named, consisting of a tank having the steam-induction pipe B, the water-eduction pipe C, the water-inlet pipe F, with rose G, the vertical plates E, the shield J, and well D, said parts being combined substantially as described.

2. The tank A, having the water-induction pipe B, the steam-eduction pipe C, the water-inlet pipe F, with rose G, the vertical plates E, connected to tank A, the shield J, between the lower end of said plates E and the pipe C, and the well D, in lower part of the tank A, below the said induction-pipe B and the eduction-pipe C, said parts being combined substantially as and for the purpose set forth.

3. A tank with a steam-induction pipe, a water-eduction pipe, a water-inlet pipe with a rose, a vertical series of plates secured within said tank and adapted to be heated by the said inlet-steam from said steam-induction pipe, a shield or hood covering the eduction water-pipe, and a water-pipe leading into said steam-pipe outside of said tank, said parts being combined substantially as and for the purpose set forth.

THOS. FOLEY.

Witnesses:
JOHN A. WIEDERSHEIM,
A. P. JENNINGS.